Dec. 6, 1966 R. J. PETSCHAUER 3,290,660
NON-DESTRUCTIVE SENSING SEMI-PERMANENT MEMORY
Filed May 2, 1960 2 Sheets-Sheet 1
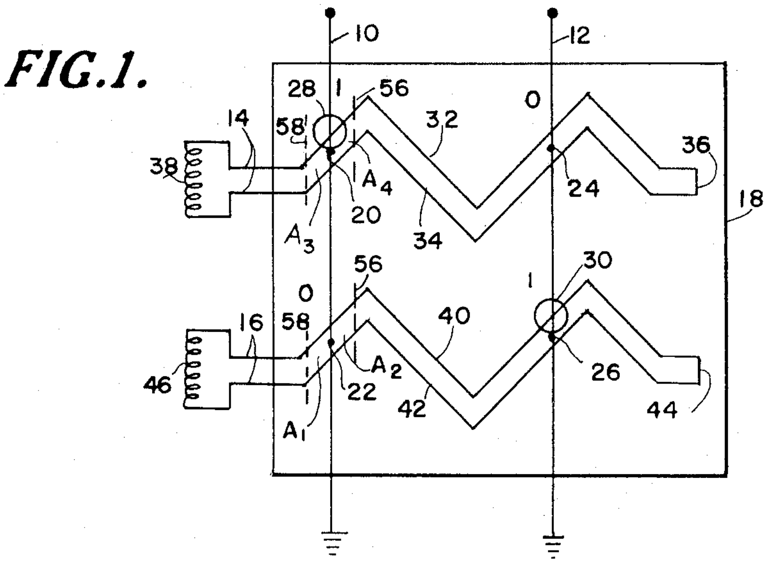
FIG. 1.
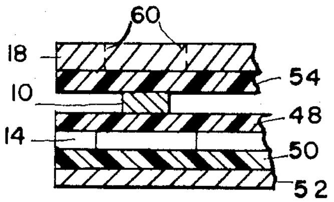
FIG. 2.
FIG. 3. FIG. 5.
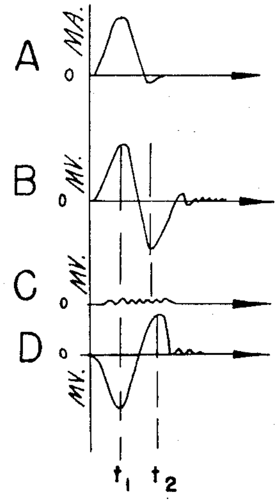
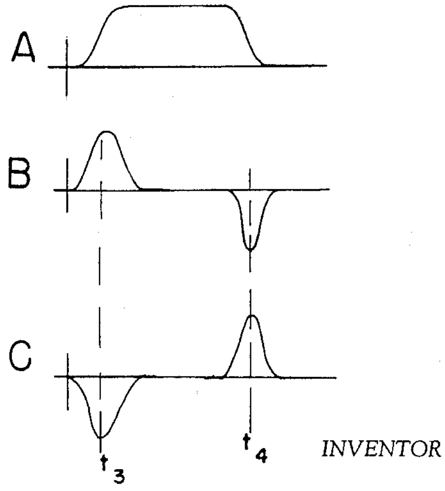
INVENTOR
RICHARD J. PETSCHAUER
BY Cushman, Darby & Cushman
ATTORNEYS

NON-DESTRUCTIVE SENSING SEMI-PERMANENT MEMORY

Filed May 2, 1960 2 Sheets-Sheet 2

INVENTOR
RICHARD J. PETSCHAUER

BY Cushman, Darby & Cushman
ATTORNEYS

United States Patent Office 3,290,660

Patented Dec. 6, 1966

3,290,660
NON-DESTRUCTIVE SENSING SEMI-PERMANENT MEMORY

Richard J. Petschauer, Bloomington, Minn., assignor to Sperry Rand Corporation, New York, N.Y., a corporation of Delaware Filed May 2, 1960, Ser. No. 26,279
17 Claims. (Cl. 340—173)

This invention relates to a storage device or memory element, and particularly to a new type of memory device which may be termed "permanent" in nature since its stored contents cannot be changed by any electrical or magnetic signals, but the stored digit can be sensed non-destructively.

In one embodiment, the present invention in the form of a memory array includes a printed circuit board on which are etched longitudinal drive lines and transverse sense or output lines. Each intersection of a drive and output line represents one binary digit storage position, with the bits of any one word lying along the same drive line. Thus, the array operates in a word-organized mode. In this embodiment, the particular state or sense of each binary digit stored depends upon the presence or absence at the bit position of a metallic, non-magnetic piece of material. Preferably, a copper plate is superposed over the whole array of drive and output lines, and is solid at all points except near a drive and sense line intersection which is to represent one sense of a binary digit, for example a binary 1. Where the plate is solid near such an intersection, the binary digit represented is of another sense, for example a binary 0.

Upon application of an interrogating current to one of the drive lines, an encircling flux is generating about that drive line along its length. Where there is an absence of a hole in the copper plate at the intersection of the sense or output line and that drive line, the encircling flux intersects the copper plate generating eddy currents therein, which in turn generate a counterflux equally in the output line areas on both sides of the drive line. Consequently, no voltage is induced in the output line.

However, where there is an aperture at the intersection of a drive line and output line, with the aperture being substantially centered on the drive line but off center of the output line, the flux which encircles the drive line in response to an interrogation current, does not cause generation of eddy currents or resultant counterflux to as great a degree in one leg of the output line loop due to the presence of the aperture. For this reason, one output line of the loop is linked by a greater net amount of flux than is the other output line of the loop. This effects an unbalanced flux condition in the output line, creating a voltage thereacross.

It is accordingly an object of this invention to provide an improved memory device which includes a plate-like element having non-magnetic, metallic and non-metallic areas respectively representing different binary digits.

Another object of the invention in conjunction with the foregoing object is the provision of means for non-destructively sensing the sense of the binary digit stored at each of the metallic and non-metallic areas of the element.

It has been found that with a device as above described, the output voltage is linear with respect to an interrogation current. Hence the apparatus connected to the different drive lines in the array for energization thereof must have a high signal-to-noise ratio to prevent "sneak" outputs onto unselected drive lines which outputs may add or produce an erroneous signal in the output lines. To prevent this from happening, it is preferable to add means to at least the digit positions representing the binary 1, for making the output voltage a non-linear function of the drive or interrogating current. To accomplish this, a saturable core, for example of the bistable, thin ferromagnetic film variety, may be employed in conjunction with each aperture in the copper plate. Even with such a core, however, the information stored is not stored in the core but is still represented by the presence or absence of an aperture at a drive and output line intersection.

Accordingly, another object of this invention is to cause the interrogation current-output voltage characteristic of a memory such as in the above objects, to be non-linear.

Still other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

FIGURE 1 schematically illustrates one embodiment of the invention;

FIGURE 2 is a cross-sectional, structural elevation view of a bit position of an array such as that schematically shown in FIGURE 1;

FIGURE 3 illustrates waveforms which may be associated with the FIGURE 1 circuit;

FIGURE 5 illustrates waveforms which may be associated with the embodiment of FIGURE 4;

Figure 8:
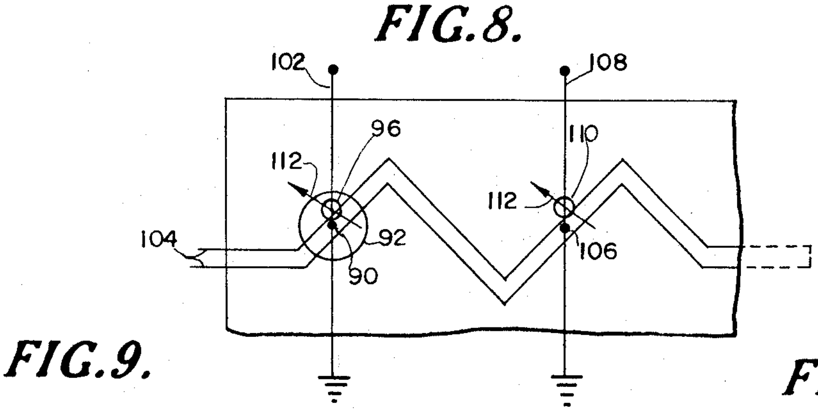
Figure 9:
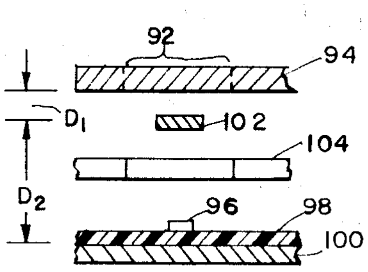

FIGURE 8 partially illustrates in schematic form still another embodiment of the invention, and FIGURE 9 is a cross-sectional elevational structural type view of a single digit position of an array such as that schematically illustrated in FIGURE 8.

The illustration in FIGURE 1 is mostly schematic, and for clarity reasons, the drive or interrogation lines 10 and 12, along with the output lines 14 and 16, are illustrated in full, rather than dotted, even though in reality they are positioned below the copper plate 18. Reference may be made to FIGURE 2 to visualize the stacked relation between the elements. This figure will be referred to in greater detail later.

The memory array illustrated in FIGURE 1 includes only four digit positions, these being at the respective intersections of the drive and output lines, for example as at points 20, 22, 24 and 26. It will be appreciated of course, that more or less digit positions may be utilized in any given memory array as desired. The digits stored respectively at positions 20 and 22, both of which are along drive line 10, constitute a binary word, while digits stored at digit positions 24 and 26 likewise represent a second binary word.

Plate 18 is of a non-magnetic metal, preferably copper, and is solid throughout its extent except at those digit positions where a binary 1 is to be stored. For example, at digit position 20, plate 18 contains an aperture 28 to represent the binary digit 1, while the binary digit 0 is represented at digit position 22 by the absence of an aperture thereat in plate 18. In like manner, the binary position represented at digit 24 is 0, while that at position 26 is a 1 due to the presence of aperture 30.

It is to be appreciated that output line 14 includes two spaced apart conductors 32 and 34 which are in the form of a loop due to their interconnection at right end 36. The other end of output line 14 may be coupled to an output winding 38. This winding may be the primary winding of a transformer or a winding on a magnetic core for example. In between the opposite ends of output line 14, the conductors 32 and 34 are preferably parallel and extend in a zig-zag manner so as to cross the drive lines at an acute angle. Similarly, output line 16 includes two separated, zig-zag, parallel extending conductors 40 and 42 formed into a loop by connection at their right end 44, and coupled at their left end to winding 46.

Preferably, the drive lines and output lines are etched or otherwise "printed" in any conventional manner onto insulative backing boards. In FIGURE 2, layer 48 may be considered the insulative backing board for drive line 10, while layer 50 may be considered the insulative backing board for output line 14. In FIGURE 1, drive lines 10 and 12 are schematically illustrated as connected separately to ground, but they may instead be connected to a common return, ground plane shown as plate 52 in FIGURE 2.

The drive lines are insulated from the apertured copper plate 18. This may be accomplished by air spacing therebetween, or as shown in FIGURE 2, a layer of insulation 54 may be employed to prevent current in the drive line from being directly connected to the copper plate 18.

Whenever an interrogation current is selectively applied to one of the drive lines 10, 12, an encircling flux is produced about the drive line along its length to the ground plane. With no aperture at the intersection of a selected drive line and an output line, for example as at digit position 22, the drive line encircling flux is intersected by the copper plate. This induces eddy currents in the copper plate, and those eddy currents in turn generate a counter flux. This counter flux reduces the net flux coupled to the output line. For any given amount of interrogation current, the drive line encircling flux extends to either side of the drive line a given distance. The side boundaries for the encircling flux, i.e., where the flux may be considered effectively zero, are arbitrarily set in the illustration of FIGURE 1 as at dash lines 56 on the right side of drive line 10, and dash lines 58 on the left side thereof. It will be appreciated that these dash lines are equidistant from the drive line. Since output line conductors 40 and 42 are separated a constant amount between dash lines 56 and 58, area $A_1$ is equal to area $A_2$. With those areas being equal and the flux density in each of those areas being also equal, the flux condition for output line 16 at digit position 22 is balanced when interrogation current is applied to drive line 10. Consequently substantially no voltage will be induced across output line 16 since equal but opposite voltages are induced in lines 40 and 42.

However, as to areas $A_3$ and $A_4$ adjacent the digit position 20, there will be a resulting unbalanced flux condition in output line 14 due to the presence of aperture 28. That is, the flux encircling drive line 10 will continue to be reduced by the counter flux generated by the eddy currents in copper plate 18 superposing the area $A_3$, but since aperture 28 allows the drive line encircling flux to complete its encirclement about drive line 10 with a considerably less amount of counter flux generation adjacent line 32, line 32 of the output line 14 will be linked by a substantially larger amount of flux than line 34 or lines 40 and 42. The difference in the flux linking lines 32 and 34 causes an unbalanced flux condition in output line 14, generating a substantial voltage across winding 38, whereas substantially no voltage is generated across output winding 46.

FIGURE 3A indicates a current waveform which may be associated with the interrogating current on drive line 10 or 12. The maximum amplitude of the current can be 200 milliamps for example, while the duration of the pulse (from the beginning through the last 0 amplitude) may be 0.1 microsecond. With such an input current on drive line 10 when it has a width of 0.08 inch, output line 14 may produce a voltage having a waveform such as in FIGURE 3B. The maximum positive amplitude thereof may be around 0.9 millivolt. This signal may be said to be a binary 1 output signal when the convention of an aperture representing a binary 1 is in effect. At the same time, when a binary 0 is represented by the absence of such an aperture, such as at digit position 22 of FIGURE 1, the voltage induced across output winding 16 in response to an interrogation current such as illustrated in FIGURE 3A, may be similar to that shown in FIGURE 3C, the small ripples being effected by "noise."

Though plate 18 is solid except in the digit position areas whereat a binary 1 is represented by the presence of an aperture, the copper areas respectively representing binary 0's may be considered effectively discrete areas even though they may not be physically separated from one another or from an apertured area. Sidewise of a drive line, the copper extends infinitely with respect to the encircling flux, i.e., considerably beyond the flux boundaries 56, 58. In addition, the copper plate extends solidly in the drive line directions from a drive-output line intersection (except for an aperture thereat, if any) considerably beyond the digit area.

From FIGURE 1 it will be appreciated that the apertures 28 and 30 in plate 18 are centered on drive lines 10 and 12 respectively, but are off center (preferably about ¼ inch) as to their respective output lines 14 and 16. The apertures need not be exactly centered on the drive line, but do need to be broader than the drive line is wide. This is indicated in FIGURE 2 wherein the dash lines 60 represent the side boundaries of aperture 28 for example. The reason for the aperture needing to be wider than the drive line and preferably substantially centered thereon, is that if it were not, the encircling flux generated in the drive line due to interrogation current applied thereto, would not be as effective in allowing a larger amount of the encircling flux to be coupled to the output line.

Figure 4:
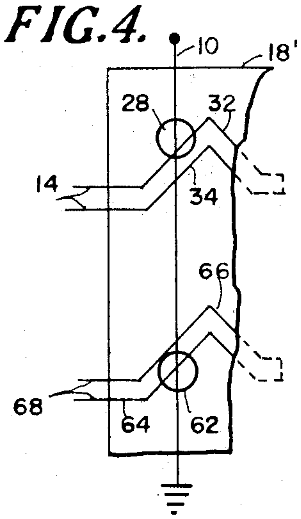
FIGURE 4 is a partial schematic of a different embodiment of the invention.

It has been discovered that if aperture 28 of FIGURE 1 is moved downward so as to be centered also on the output line, for example concentric with point 20, there would be substantially no voltage generated across output line 14 when an interrogation current is applied to line 10. Further, it has been discovered that if aperture 28 remained centered on drive line 10, but were moved further downward so as to be relative to conductor 34 in the same manner that it is illustrated relative to conductor 32, the voltage induced across output line 14 is of an opposite polarity. That is, as shown in FIGURE 4, when aperture 62 superposes the lower conductor 64 rather than the upper conductor 66 of output line 68, the output signal on line 68 will be similar to that shown in FIGURE 3D rather than like that shown in FIGURE 3B. The main difference between these two signals is that they are 180° out of phase, i.e., one initially goes positive while the other initially goes negative. Therefore, a memory can be constructed with apertures at all digit positions, with the apertures being above the center of the output line or below it to represent binary 1 and 0 stored conditions. This has the advantage that, without any of the digit positions having no-hole, a self-checking memory can be provided. That is, if current is actually applied to drive line 10 in FIGURE 4, and there is no output signal generated in either of the sensing amplifiers (not shown) which would be associated with output lines 14 and 68, then it can be presumed that those amplifiers are faulty. On the other hand, if during the time when an interrogation current should appear, there is no output signal on output lines 14 and 68, it can be assumed the apparatus (not shown) which generates the interrogation current is faulty.

By using an aperture at each digit position, it is also possible to obtain either non-complement and complement output signals, or both, at appropriate times. That is, in comparing FIGURES 3B and 3D, it will be appreciated that if the output signals were strobed at time $t_1$, the output signal would be a noncomplement, while if the outputs were strobed at time $t_2$, they would be complements relative to the signals at time $t_1$ and also relative to the interrogation current. If the time between times $t_1$ and $t_2$ is too short for good differentiation, the interrogation or drive current can be prolonged as indicated in FIGURE 5A. That is, the interrogation current can be held at its maximum amplitude for a given period of time. In this manner, the signal on output line 14 during the positively rising portion of the interrogation current is a positive pulse as shown in FIGURE 5B, while simultaneously the signal on output line 68 is a negative pulse. As shown in FIGURE 5C, both of these pulses reduce to zero amplitude and stay there while the interrogation current remains at its maximum amplitude. However, when the interrogation current is turned off so that its waveform reduces to zero amplitude, output line 14 will carry a negative pulse, while output line 68 will carry a positive pulse. Then, if the strobing of the output signals is such as to catch them at their maximum, or near maximum amplitudes, the time between the strobing times $t_3$ and $t_4$ will be sufficiently long to allow the differentiation between the signals.

Because the flux conditions for output lines 14 and 68 in the embodiment of FIGURE 4 are unbalanced in opposite directions to produce the opposite polarity signals, a three stable state memory device can be constructed when those two conditions along with the absence of an aperture in the copper plate are effected. For example, in FIGURE 6, at digit position 70 there is an aperture 72 located in plate 18″ above the center of the output line 74, at digit position 76 there is no aperture for output line 78 and at digit position 80 there is an aperture 82 located below the center of output line 84. For these respective apertures and no-aperture, the output signals of FIGURES 3B, C and D may be obtained to indicate for example a +1, 0, −1 type of ternary condition.

Figure 6:
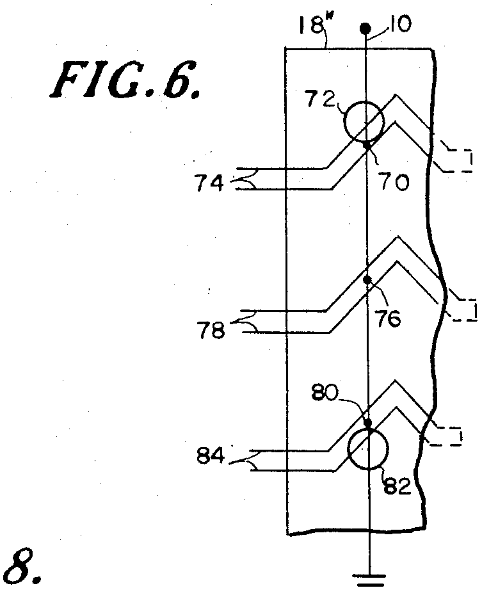
FIGURE 6 is a partial illustration of still another embodiment of the invention.
Figure 7:
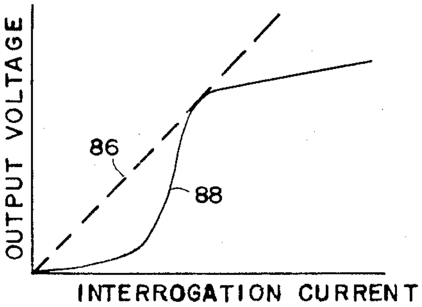
FIGURE 7 is a graph showing voltage current characteristics.

It has been noticed that the output voltage on any of the output lines in FIGURES 1, 4 and 6 associated with an interrogated digit position at which there is an aperture, has a linear function relative to the interrogating current. This is illustrated in FIGURE 7 by the dash line 86. A disadvantage thereof is that the selection gates (not shown) associated with the drive lines must be quite sensitive in order to prevent "sneak" outputs from the ones of those gates which are not to provide an output. In other words, each word gate should have a high signal-to-noise ratio. In order to reduce that ratio, it is preferable to cause the output voltage vs. interrogation current characteristic to be non-linear similar to curve 88 in FIGURE 7. To effect this non-linearity, a non-linear element may be added to the array at least at each intersection where there is an aperture in the copper plate. This is illustrated in FIGURE 8 wherein at the digit position 90 at which is stored a binary 1 by the presence of aperture 92 in copper plate 94, there is also disposed a non-linear element 96. This element may be a saturable magnetic core and is preferably, but not necessarily, of the bistable, thin film ferromagnetic type for example as may be produced in accordance with Patent No. 2,900,282. The stacked relation between the elements in FIGURE 8 is indicated in FIGURE 9 with the thin film 96 being illustrated as deposited on a substrate 98 of glass or the like, which in turn is disposed on the ground plane 100. Between the film 96 and copper plate 94, are the drive line 102 and output line 104.

In the embodiment of FIGURES 8 and 9, aperture 92 is preferably made considerably larger than the apertures 28 and 30 in FIGURE 1 and the like apertures in FIGURES 4 and 6, and is also positioned on center not only with the drive line 102, but also as to the output line 104.

In other words, aperture 92 is preferably coaxial with digit point 90. On the other hand, film core 96 is off center relative to the center of output line 104, and preferably on center relative to drive line 102. It is to be emphasized, however, that the presence of core 96 is not for the purpose of storing any information since it is still the presence of aperture 92 at digit position 90 relative to the absence of such an aperture as at digit position 106, that determines the binary information stored. The magnetic core 96 is effective only to change the output voltage-interrogation current characteristic from being linear to a non-linear curve as previously indicated relative to FIGURE 7.

Without an aperture being present at digit position 106, interrogation current applied to drive line 108 is insufficient, in conjunction with the counter fluxes generated in the copper plate 94, to cause the thin film core 110 to change its stable state condition. Preferably the thin film cores 110 and 96 have their easy axes oriented as indicated by arrow 112. When digit position 106 is interrogated, the magnetization of core 110 may be slightly rotated, but will relax into its initial condition upon release of the interrogation current. However, when interrogation current is applied to drive line 102, the flux coupled to core 96 is larger, due to the presence of aperture 92 than is the flux coupled to core 110 when interrogation current is applied to drive line 108, and consequently core 96 may be switched to its opposite stable state. This provides the non-linearity desired for the output voltage relative to the interrogation current. When core 96 is so switched, it is then desirable to apply an opposite polarity re-switching pulse to drive line 102, to re-orient the magnetization of the core back to its initial state. However, core 96 may be operated in a non-destructive mode whereby even when aperture 92 is present, core 96 will not be switched but will still provide the desired non-linearity. That is, the easy axis of the core may be so oriented that in view of the interrogation current amplitude, the magnetization of the core does not rotate beyond its irreversible threshold upon the application of the interrogating current, and consequently reversibly rotates back to its initial condition upon the release of the interrogation current.

The relative field strength applied to the film when drive line current is applied may be regulated by adjusting the ratio of the distance $D_1$ to distance $D_2$ in FIGURE 9. To a first order approximation, the smaller the ratio of $D_1$ to $D_2$, the smaller is the field applied to the film core in a no-hole condition.

Though a magnetic core is shown adjacent digit position 106 in FIGURE 8, it is not necessary that that core be present thereat since that position stores a binary 0 and there would consequently be no bothersome output voltage therefrom even in the presence of "sneak" current on line 108 of any significant amplitude relative to that which would be obtained from digit position 90. However, at the same time, it is preferred to construct an array with a magnetic core at each digit position to allow for interchangeability of copper plates storing different words as below indicated.

In the different embodiments of this invention, it is apparent from the foregoing that the apertured copper plate may be changed to another copper plate which has apertures in different positions to represent different binary words stored. This invention therefore provides a "permanent" memory device since the aperture and no-aperture conditions in any one plate cannot be destroyed by any electrical or magnetic signal, but the words stored in the memory may be changed by manually replacing a plate with another plate, and any word stored in any plate disposed adjacent the drive and sense lines may be sensed non-destructively by selectively applying interrogation current to one of the drive lines.

A memory array constructed in accordance with this invention may be employed in any one of numerous arrangements wherein it is desired to follow a fixed program which needs to be changed infrequently or at least does not need to be changed during the operation of the array. The memory of this invention, unlike magnetic core storage memories or "Twistors," capacitors, ferroelectric elements, and other commonly used memory devices, does not depend upon the hysteretic properties of some non-linear material for storage capabilities, but instead uses the inductive characteristics of magnetically coupled wires.

Although the invention has been described above relative to the use of a non-magnetic, apertured metallic plate with the apertures and lack thereof representing binary information, the invention broadly covers the general concept of balancing and unbalancing the flux condition of an output line in response to an interrogation current. The use of an apertured non-magnetic metal plate provides the advantage of substantially shielding the flux from any surrounding apparatus especially when a common ground plate is employed, but the lack and presence of non-magnetic metallic storage means at the different digit positions may be effected without employing a plate over the whole array. For example, if no such plate is used, but instead a binary 0 is represented by the absence at a digit position of any material which would increase or decrease the amount of flux coupled to either side area of the output line adjacent a drive line, while a binary 1 is represented by the presence of a copper slug off center relative to an output line so as to unbalance its flux condition, two substantially different values of output voltage may be obtained according to the sense of the binary digit represented. Such a copper slug may be a solid piece of copper disposed relative to a digit position the same as aperture 28 for example in FIGURE 1, or as described and claimed in the copending application of Andre M. Renard, Serial No. 26,358, filed May 2, 1960, now Patent 3,130,388, the "slug" may be a copper ring placed underneath the sense line to one side of the drive line.

There has accordingly been described a memory device with non-destructive sensing provisions which is particularly suited, for example, for instruction storage purposes usable in fixed-program machines. The memory has advantages of high speed operation, easy fabrication, low cost, low power level, insensitivity to environment, and high reliability of operation. There is no element in the memory which has a characteristic that would change with either time or operation (excluding perhaps the memory cores in the FIGURE 8 embodiment, to some slight degree), and hence the reliability of an overall memory circuit would depend strictly on the reliability of the memory control circuits (not shown) rather than on the memory structure itself.

Thus, it is apparent that all the advantages and objects herein set forth have been successfully achieved by this invention.

Modifications of the invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A memory device comprising a non-magnetic metal plate having an aperture in at least one given area for representing a binary digit of one sense, an opposite sense binary digit being represented by the absence of an aperture in the plate at another area, and a non-linear magnetic element disposed in a plane adjacent said plate at at least each area which has an aperture therein with the aperture in projection encompassing said element and the element being disposed off center relative to the center of its respective area of the plate.

2. A memory device with non-destructive sensing provisions comprising a drive line for carrying an interrogating current, an output line crossing said drive line insulated therefrom but inductively coupled thereto, and non-magnetic means representing binary digits for effecting in the output line in response to an interrogating current a balanced flux condition if the binary digit represented is of one sense and an unbalanced flux condition if the binary digit represented is of another sense.

3. A device as in claim 2 wherein the drive and output lines cross each other at an acute angle.

4. A device as in claim 2 wherein the unbalanced fluxes in the output line induces a voltage across the ouput line which has a substantially linear characteristic relative to the drive current, and further including means for causing that characteristic to be non-linear.

5. A device as in claim 4 wherein the last mentioned means includes a saturable magnetic core.

6. A device as in claim 2 wherein the said means, drive line and output line are stacked in the order last named.

7. A device as in claim 6 wherein said means comprises a non-magnetic metallic plate having an aperture near the intersection of said lines and otherwise solidly extends in the drive line directions substantially beyond the output line and to either side of the drive line substantially beyond the effective side boundary of any drive line flux.

8. A device as in claim 7 wherein said lines cross at an acute angle and said aperture is substantially centered on and is wider than the drive line and is off center relative to said output line.

9. A device as in claim 7 and further including a non-linear element disposed adjacent said aperture and off center relative to said intersection with the aperture effectively encompassing the element.

10. A memory device with non-destructive sensing provisions comprising an output line in the form of a loop having two legs, means including a drive line crossing said output line but insulated therefrom for coupling, when a changing current is carried by said drive line, a first flux to one of said legs of the output line and simultaneously a second flux to the other leg of the output line, said second flux being substantially equal in magnitude but of opposite polarity to said first flux whereby substantially no net signal is generated in said output line, and non-magnetic means for causing said first and second fluxes to be unequal when current is applied to said drive line to effect generation of a substantial net signal in the output line.

11. A device as in claim 10 and further including means for causing the generated substantial net signal to have a non-linear characteristic relative to said current.

12. A memory device with non-destructive sensing provisions comprising a drive line for carrying an interrogating current to produce a flux encircling the drive line, a plurality of output lines each in the form of a loop having two legs inductively coupled to said flux at spaced digit positions along said drive line, means at at least one of said digit positions representing a binary digit of one sense and positioned closer to but electrically insulated from the drive line than the respective output line for generating in response to said encircling flux a flux countering the encircling flux linking both legs of said output line whereby no net flux is coupled to said output line, and means at at least one other of said digit positions representing a binary digit of another sense and positioned closer to but electrically insulated from the drive line than the respective output line for generating a given amount of flux countering the encircling flux linking one leg of said output line and for generating a flux of an amount substantially less than said given amount for countering the encircling flux linking the other leg of said output line whereby a net flux is coupled to said output line.

13. An information storage device comprising: first and second sets of electrical conductors; means for mounting said first and second sets of conductors respectively in first and second adjacent spaced parallel planes, said sets of conductors being so disposed that each conductor of said first set crosses over each conductor of said second set whereby a plurality of storage locations are formed each of which location is uniquely defined by the cross-over of a particular conductor of said first set and a particular conductor of said second set; said sets of conductors further disposed in inductive relationship such that current pulses applied to conductors of said first set develop a balanced flux condition linking conductors of said second set so substantially no potential is induced in the second set conductors; and a sheet of non-magnetic metallic material laying over said sets of conductors in a spaced parallel plane having apertures therein in the vicinity of selected ones of said defined storage locations for unbalancing the flux linkage between the conductors of said first and second sets which define the corresponding storage location.

14. A memory device with non-destructive sensing provisions comprising:
- a drive line,
- an output line insulated from but in inductive relationship to said drive line,
- an apertured copper plate for effecting an unbalanced flux condition in the output line when current is applied to the drive line, and
- a different non-linear magnetic element disposed adjacent each aperture in said plate.

15. A memory device with non-destructive sensing provisions comprising:
- a copper plate for effectively storing the digits of a binary word respectively at a plurality of effectively discrete digit positions,
- said plate having an aperture at each digit position which effectively stores a binary digit of one sense and no aperture at each digit position which effectively stores a binary digit of another sense,
- a plurality of output lines respectively associated with said digit positions, and
- a drive line crossing but insulated from each of said output lines at said digit positions,
- each of said apertures extending sidewise of each edge of the drive line at the respective digit positions,
- said drive line carrying an interrogation current to effect in any output line whose associated digit position stores a binary digit of said one sense a given unbalanced flux condition and to effect a substantially balanced flux condition in an output line associated with such another sense digit.

16. A device as in claim 15 wherein the non-magnetic means effectively stores any binary digit of said another sense in such a manner that an interrogation current through the drive line effects in an output line associated with such another sense digit an unbalanced flux condition of polarity opposite said given unbalanced flux condition.

17. A memory device with non-destructive sensing provisions comprising:

- a copper plate having means for effectively storing the digits of a binary word respectively at a plurality of effectively discrete digit positions,
- a plurality of output lines respectively associated with said digit positions and
- a drive line crossing but insulated from each of said output lines at said digit positions for carrying an interrogation current to effect in any output line whose associated digit position stores a binary digit of one sense a given unbalanced flux condition and to effect a different flux condition in any output line associated with a digit position storing a binary digit of another sense,
- said storing means including apertures in said plate for effectively storing any binary digit of said another sense in such a manner that an interrogation current through the drive line effects in an output line associated with such another sense digit an unbalanced flux condition of polarity opposite said given unbalanced flux condition,
- said apertures at each of said digit positions being wider than and substantially centered on the drive line thereat, an aperture at any digit position storing a binary digit of said one sense being off center in one direction along the drive line relative to the intersection of the drive and output lines at that position and an aperture at any digit position storing a binary digit of said another sense being similarly off center but in an opposite direction along the drive line.

References Cited by the Examiner

UNITED STATES PATENTS

| | | | |
|---|---|---|---|
| 1,295,691 | 2/1919 | Cahill | 336—75 |
| 2,820,216 | 1/1958 | Grottrup | 340—174 |
| 2,896,713 | 7/1959 | Gerdemann | 340—166 |
| 2,898,483 | 8/1959 | Muller | 340—166 |
| 2,949,226 | 7/1960 | Lubkin | 235—61.116 |
| 3,003,143 | 10/1961 | Beurrier | 340—173 |
| 3,061,821 | 10/1962 | Gribble | 340—174 |
| 3,102,999 | 9/1963 | Bernemyr | 340—174 |

OTHER REFERENCES

I.R.E. Convention Record, Part IV, 1954, pages 106–108 (by Lubkin), Class 235-61.116.

TERRELL W. FEARS, *Acting Primary Examiner.*

IRVING SRAGOW, E. R. REYNOLDS, *Examiners.*

R. G. LITTON, K. E. JACOBS, T. W. FEARS, *Assistant Examiners.*